United States Patent
Field et al.

(10) Patent No.: US 9,967,601 B2
(45) Date of Patent: May 8, 2018

(54) UNIVERSAL SERVICES MULTIPLEXER AND TIME-BASED INTERLEAVING OF MULTIPLE STREAMS

(71) Applicant: Aurora Networks, Inc., Santa Clara, CA (US)

(72) Inventors: Michael Field, Redwood City, CA (US); Javier A Solis, Sunnyvale, CA (US); Rei Chen Brockett, Menlo Park, CA (US); Dave Baran, Atherton, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days. days.

(21) Appl. No.: 14/276,966

(22) Filed: May 13, 2014

(65) Prior Publication Data

US 2015/0020130 A1    Jan. 15, 2015

Related U.S. Application Data (60) Provisional application No. 61/822,549, filed on May 13, 2013.

(51) Int. Cl.
| | |
|---|---|
| *H04N 21/2315* | (2011.01) |
| *H04N 21/2365* | (2011.01) |
| *H04N 21/2381* | (2011.01) |
| *H04H 20/69* | (2008.01) |
| *H04N 7/22* | (2006.01) |
| *H04N 21/61* | (2011.01) |
| *H04L 12/28* | (2006.01) |
| *H04L 27/34* | (2006.01) |

(52) U.S. Cl.
CPC ........ *H04N 21/2365* (2013.01); *H04H 20/69* (2013.01); *H04L 12/2838* (2013.01); *H04N 7/22* (2013.01); *H04N 21/2315* (2013.01); *H04N 21/2381* (2013.01); *H04N 21/6118* (2013.01); *H04N 21/6125* (2013.01); *H04L 27/34* (2013.01)

(58) Field of Classification Search
USPC .................................. 725/109, 129
See application file for complete search history.

(56) References Cited

U.S. PATENT DOCUMENTS

| | | | |
|---|---|---|---|
| 6,956,842 B1 * | 10/2005 | Okumura et al. | 370/350 |
| 7,623,589 B2 * | 11/2009 | Oyman et al. | 375/267 |
| 9,027,068 B2 * | 5/2015 | McKiel, Jr. | H04N 7/17318 725/100 |
| 2004/0008737 A1 * | 1/2004 | McClellan | H03M 13/256 370/535 |

(Continued)

OTHER PUBLICATIONS

International Search Report and Written Opinion from PCT/US2014/037929 dated Aug. 18, 2014.

(Continued)

*Primary Examiner* — Pankaj Kumar
*Assistant Examiner* — Charles N Hicks
(74) *Attorney, Agent, or Firm* — Carol J. Ansley (57) ABSTRACT

Interleaving multiple streams of data using a universal services multiplexer is followed by conveying a time interleaved multiplexer stream to a remote QAM module. A universal services multiplexer interleaves multiple streams of data into a time interleaved multiplexer stream.

19 Claims, 7 Drawing Sheets (56) References Cited

U.S. PATENT DOCUMENTS

| | | | | |
|---|---|---|---|---|
| 2008/0170530 A1* | 7/2008 | Connors | ................ | H04H 20/67 |
| | | | | 370/312 |
| 2008/0310526 A1* | 12/2008 | Maltsev | .............. | H04L 27/2628 |
| | | | | 375/260 |
| 2009/0249421 A1* | 10/2009 | Liu | ..................... | H04L 12/2801 |
| | | | | 725/116 |
| 2010/0290561 A1* | 11/2010 | Ko | ........................ | H04L 1/0041 |
| | | | | 375/298 |
| 2012/0307842 A1* | 12/2012 | Petrov | .............. | H04N 21/23608 |
| | | | | 370/474 |

OTHER PUBLICATIONS

"Headend and Hub—Universal Services Multiplexer" retrieved on Aug. 6, 2014.
"Defining the Evolution Universal Services Node QAM" retrieved on Aug. 6, 2014.
International Preliminary Report on Patentability from PCT/US2014/037929, dated Nov. 26, 2015.

* cited by examiner

UNIVERSAL SERVICES MULTIPLEXER AND TIME-BASED INTERLEAVING OF MULTIPLE STREAMS

CROSS-REFERENCE TO RELATED APPLICATION

Referring to the application data sheet filed herewith, this application claims a benefit of priority under 35 U.S.C. 119(e) from provisional patent application U.S. Ser. No. 61/822,549, filed May 13, 2013, the entire contents of which are hereby expressly incorporated herein by reference for all purposes.

BACKGROUND

Figure 1:
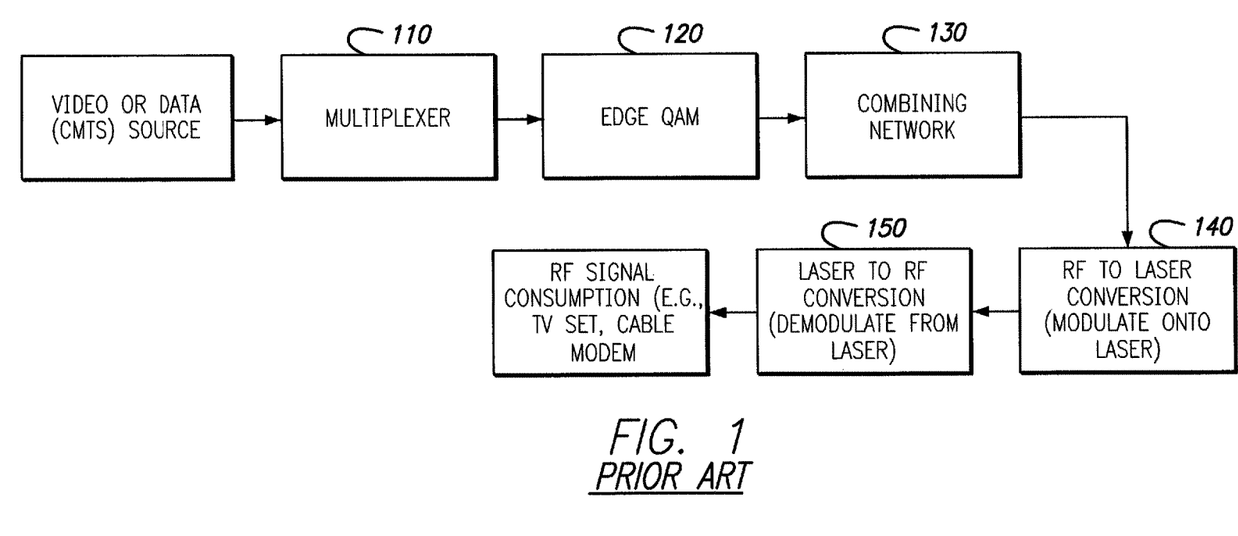
FIG. 1 is a block schematic view of a conventional hybrid fiber coax (HFC) network, appropriately labeled "PRIOR ART."

FIG. 1 shows the current method of video distribution. Video signals are processed by a MPEG (moving pictures expert group) multiplexer 110 and fed to an edge QAM (quadrature amplitude modulator/demodulator for switched digital video). The multiplexer and edge QAM 120 are often combined into the same device which produces RF (radio frequency) output which is then combined (as an analog signal) in a combining network 130 which is then modulated onto a laser 140, carried over a fiber optic network, and converted back to an RF signal at the edge 150. This is known as a hybrid fiber/coax network.

As the bandwidth of the signal carried across the laser increases, the signal quality decreases. Eventually, gains in capacity that were previously achieved by making the bandwidth larger are lost to decreased signal quality. To continue increasing bandwidth capacity to the edge of the network, a different approach is needed.

SUMMARY

There is a need for the following embodiments of the present disclosure. Of course, the present disclosure is not limited to these embodiments.

According to an embodiment of the present disclosure, a method comprises: interleaving multiple streams of data using a universal services multiplexer; and conveying a time interleaved multiplexer stream to a remote QAM module. According to another embodiment of the present disclosure, an apparatus comprises a universal services multiplexer that interleaves multiple streams of data into a time interleaved multiplexer stream.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well known techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Figure 2:
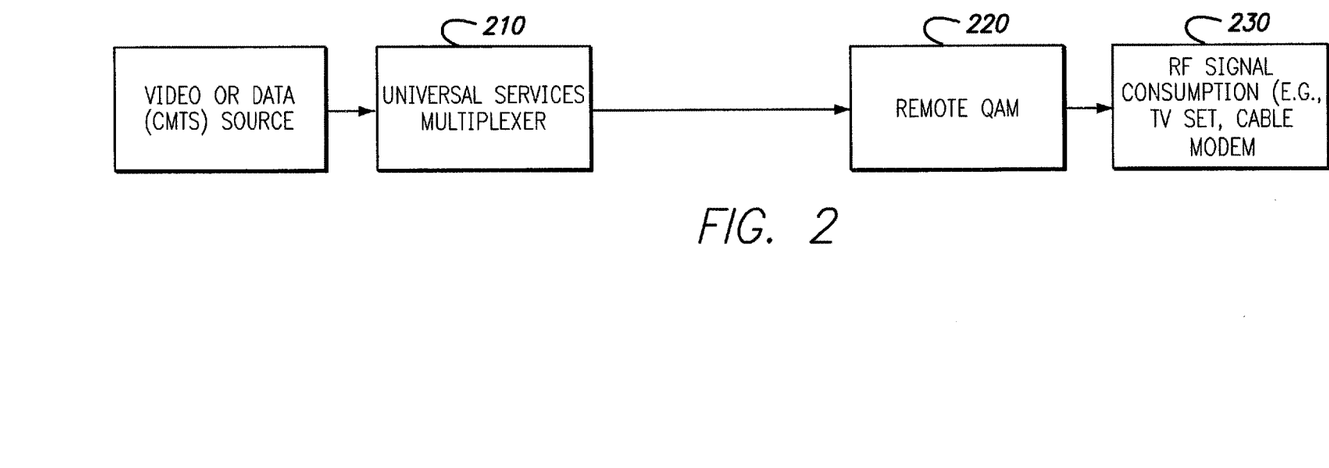
FIG. 2 is a block schematic view of a universal services multiplexer coupled to a remote QAM.

FIG. 2 shows a network that eliminates the loss due to the combining network and analog modulation/demodulation by eliminating these stages. A universal services multiplexer 210 accepts the data streams, but produces an output format that can be digitally transported to a remote QAM 220 at the edge of the network. This increases capacity significantly, and allows bandwidth to be expanded because of improved signal quality due to elimination of the analog conversions as well as making frequency reuse much easier/more cost effective by eliminating the RF combining network. The problem to be solved is how to make this digital link work economically, as traditional approaches for transmitting this type of data require significant processing power to produce the QAMs and require large units located at the head end. For the remote QAM to work, it is advantageously capable of operating in an outdoor environment, and is advantageously size limited to fit inside of existing operator plant equipment. This imposes constraints of size (it should not be much larger than a brick), power (it should not need over 25 watts), and cooling (it should not need fans or chilled water) which impose significant limits on the technology that can be used in the remote QAM. Data from the remote QAM is then conveyed to a customer premises single RF equipment 230.

To make this work, the instant disclosure uses a novel approach for splitting the functionality into a head-end component which does the heavy processing and a field component which does the bare minimum that it can within the environmental constraints of a piece of field equipment that may be hanging from an overhead cable or be buried in a street equipment vault. In making this work, the link between the two devices is critical, and the instant disclosure offers a novel solution to making the system work.

The remote QAM module produces an output which combines multiple streams to produce a single RF output. The remote QAM device is deployed in the field environment, typically in an outdoor node. The node has demanding power and cooling requirements which greatly restrict the amount of processing power that can be placed into the node.

A universal services multiplexer (USM) is a device located at the cable operator head end which takes single or multiple program transport streams (SPTS {single program transport stream} or MPTS {multiple program transport stream}) and processes them to produce a sequence of data which is fed to the remote QAM. In a preferred embodiment, this is done by interleaving the data in the streams into a serial bit stream before transmitting it to the remote QAM via a dedicated laser.

In some embodiments, customers may prefer to locate the USM where it may not have direct access to the fiber which is feeding the nodes. To allow the output of the USM to transit their existing data networks, it is necessary to add IP headers to the data stream so that it can be transported over the network (e.g., Ethernet).

Figure 3:
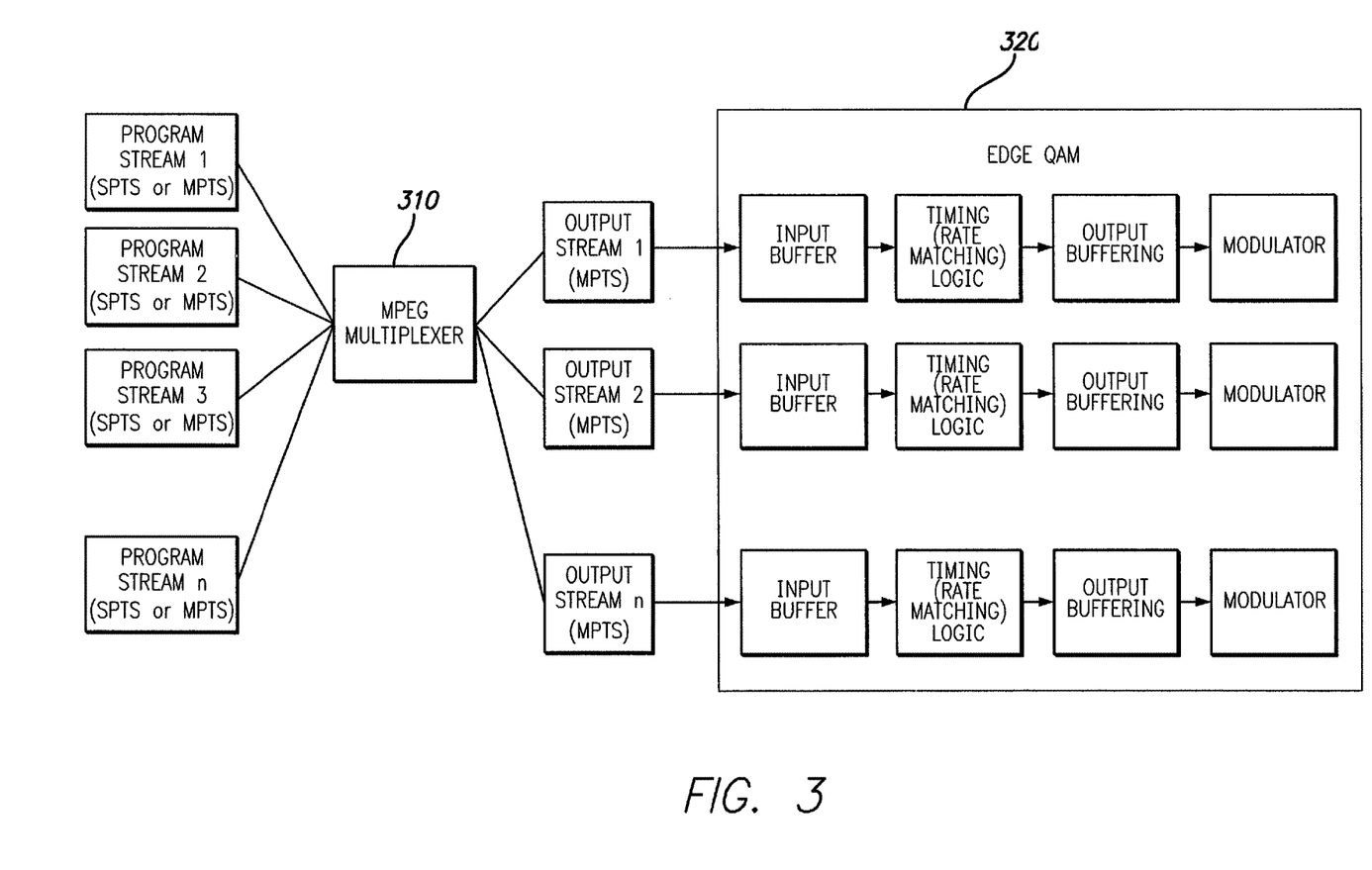
FIG. 3 is a block schematic view of an MPEG multiplexer coupled to an edge QAM.

FIG. 3 illustrates an MPEG multiplexer 310 at the cable operator head end will accept the SPTS and MPTS inputs, and will produce a series of MPTS outputs which then go to the edge QAM 320. The edge QAM is required to properly time the output, and to maintain this timing through the use of dedicated buffers for each MPTS. This approach would require a distributed transmitter located in the node to buffer the streams using local memory in the node. The approach shown in FIG. 3 does not work for higher volumes of data due to the processing constraints in the node.

Figure 4:
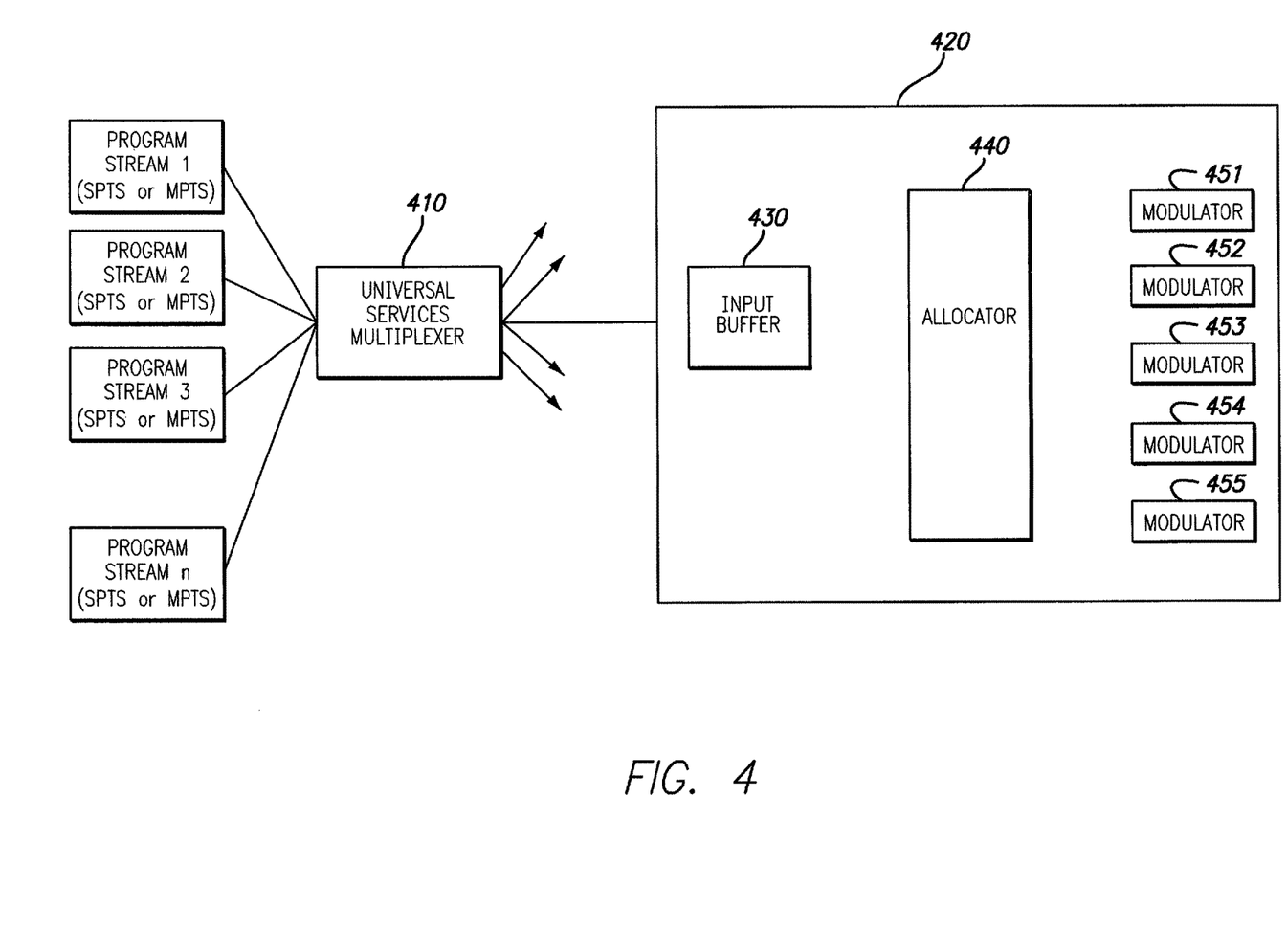
FIG. 4 is a block schematic view of a universal services multiplexer coupled to a remote QAM.

Referring now to FIG. 4, the design shown in FIG. 4 solves the buffering and processing problem mentioned above by locating the logic (programs and resources) at the universal services multiplexer 410. The USM accepts input streams and produces a time interleaved multiplexer stream (TIMS). A TIMS output stream is broken into segments where each segment fits within an Ethernet frame (either regular or jumbo, depending on the choice of the operator and the capabilities of the transport network) for transit between the USM and the remote QAM. The segment can be encapsulated with a normal layer 2, IPv4, or IPv6 header.

Each TIMS segment is comprised of one or more TIMS chunks. A TIMS chunk includes of between zero and 1518 bytes destined for a particular output modulator. An input buffer 430 in the remote QAM accepts data from the Ethernet from the head end. An allocator 440 discards the packet header needed only for transport, and then splits the segment into a series of TIMS chunks, which are processed sequentially to feed the data to the appropriate modulator (451-455).

A key difference of the USM design of this disclosure is that all of the timing and rate management is conducted at the USM; after leaving the USM, the only buffering is the bare minimum needed for the individual modulators. TIMS chunks are sequenced for transmission by the USM to ensure that the individual modulators in the remote QAM remain full. Thus, there will be more data in TIMS chunks targeted for higher data rate streams. If a remote QAM is inactive, there will be no TIMS chunks for it.

The TIMS segment is comprised out of the TIMS chunks that are ready to go at any particular time; an analogy would be a shuttle bus that leaves once all the seats are full. As the rate feeding the remote QAM is larger than the output rate of the node QAM (universal services multiplexer), there is flexibility in terms of how the data can be scheduled. A TIMS chunk must never be larger than the minimal modulator buffer. This means that a high data rate stream will receive multiple, more frequent TIMS chunks instead of a single, larger one.

Figure 5:
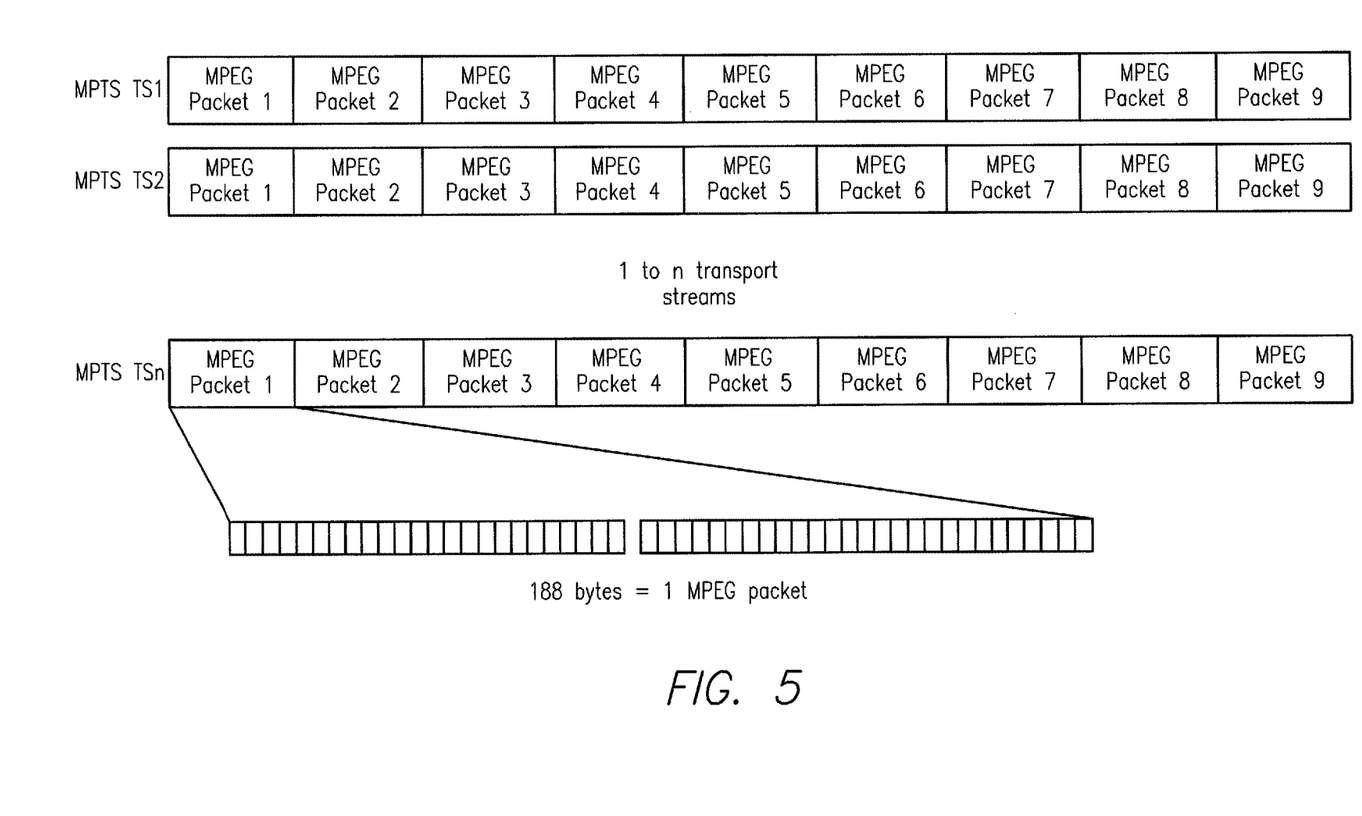
FIG. 5 is a schematic view of MPEG packets.

FIG. 5 shows that MPEG transport streams are comprised of a sequence of MPEG packets, each which is 188 bytes in length. Current edge QAM devices accept multiple MPTS streams, with each stream arriving without coordination with the arrival time of other streams. In order to deliver output data at a constant rate (which is required by MPEG transport stream-based devices), the edge QAM device has to buffer the individual streams to correct for network delays and jitter, which can require a large amount of memory. In many remote (field) installations, this becomes impractical due to space, power, or processor constraints.

Figure 6:
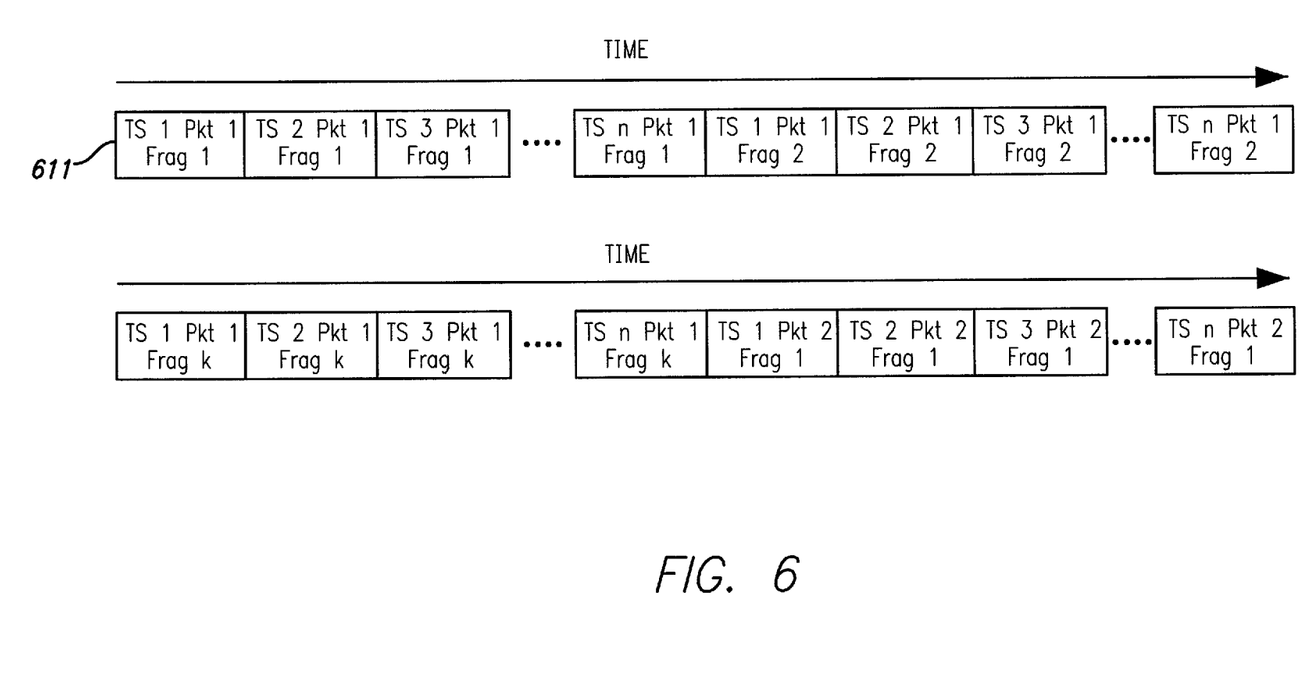
FIG. 6 is a schematic view of interleaved transport streams.

FIG. 6 shows that each of the packets for each transport stream is broken down to fragments 611, where the fragment length is the size of a TIMS chunk. This size could be as small as 1 (to minimize buffering) or could be longer if desired to minimize complexity of the interleaving logic. Using a length of 188 bytes is optimal for some designs as this can provide a complete MPEG frame to a J.83 encoder. By sequencing the stream prior to transmission to the modulator, it becomes possible to generate many output QAMs with minimal buffering in devices located at the edge of the video network (where fiber ends and coax begins).

Although the transport streams are shown in sequential order in FIG. 6, the streams could be delivered in a different sequence (e.g., TS 1 could be followed by TS 3 and then TS 2). The fragments could be delivered out of sequence, but this would increase memory usage and that would be sub-optimal. The stream shown in FIG. 6 represents how data arrives at the modulator over time. The stream shown is serial, and may be carried as a bitstream over a dedicated fiber to the modulator at the edge of the network.

Figure 7:
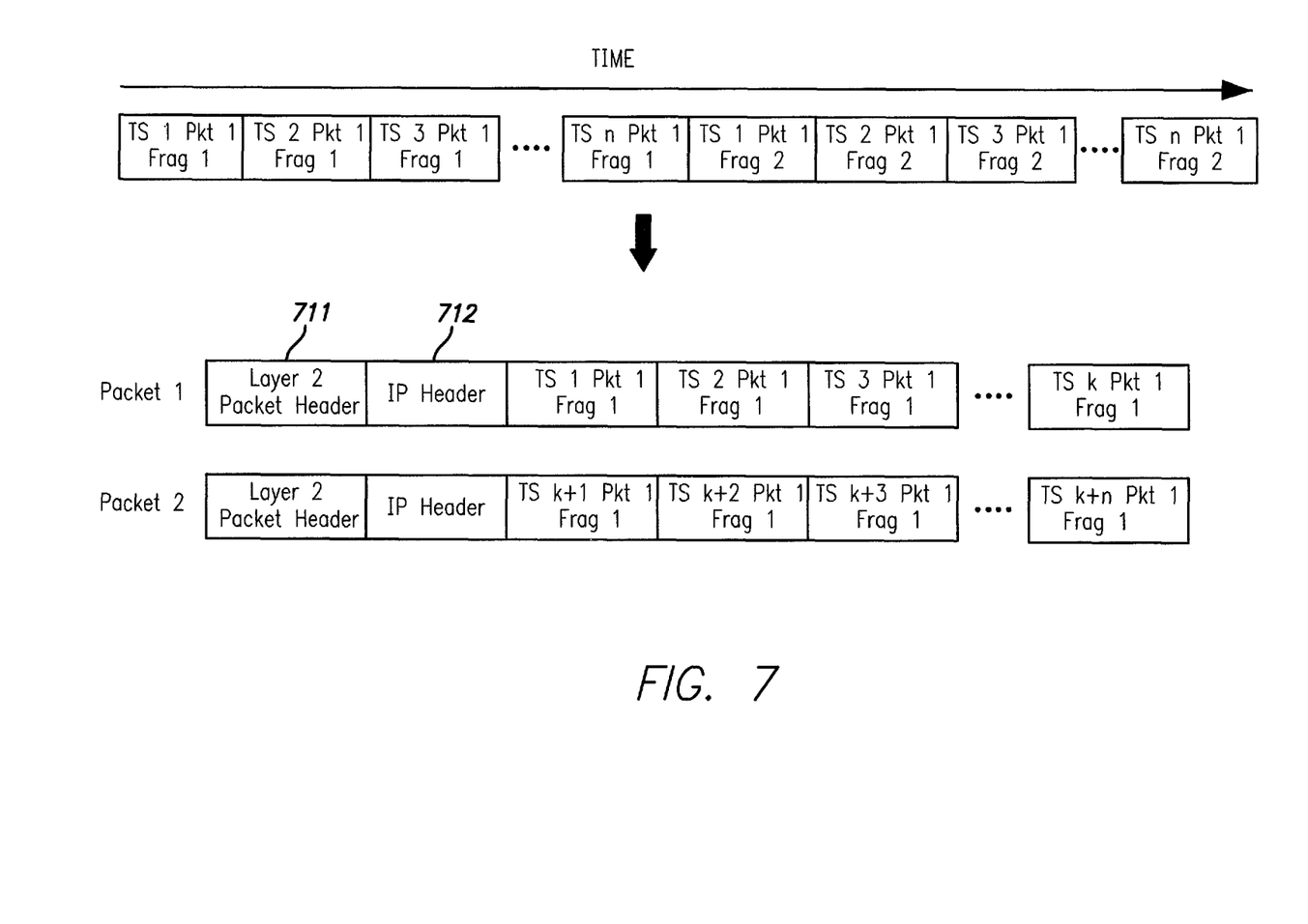
FIG. 7 is a schematic view of interleaved transport streams.

Referring to FIG. 7, alternatively this stream may be broken down into packets with IP headers added, which would allow use of conventional Ethernet switching/routing technology between the multiplexer and remote QAM. The stream has layer 2 headers 711 and IP headers 712 inserted and the data from the stream is added until an optimal packet size is reached for the IP network (between 1300 and 9000 bytes total, including headers, depending on whether jumbo frames are supported by the Ethernet technology in use).

For environments with questionable fiber quality, parity checking in the form of LDPC (low density parity check), additional FEC (forward error correction), or a CRC (cyclic redundancy check) checksum can be added to the stream between the universal services multiplexer and the remote QAM. The above mentioned checks are examples and embodiments of this disclosure can include other check technologies.

Figure 8:
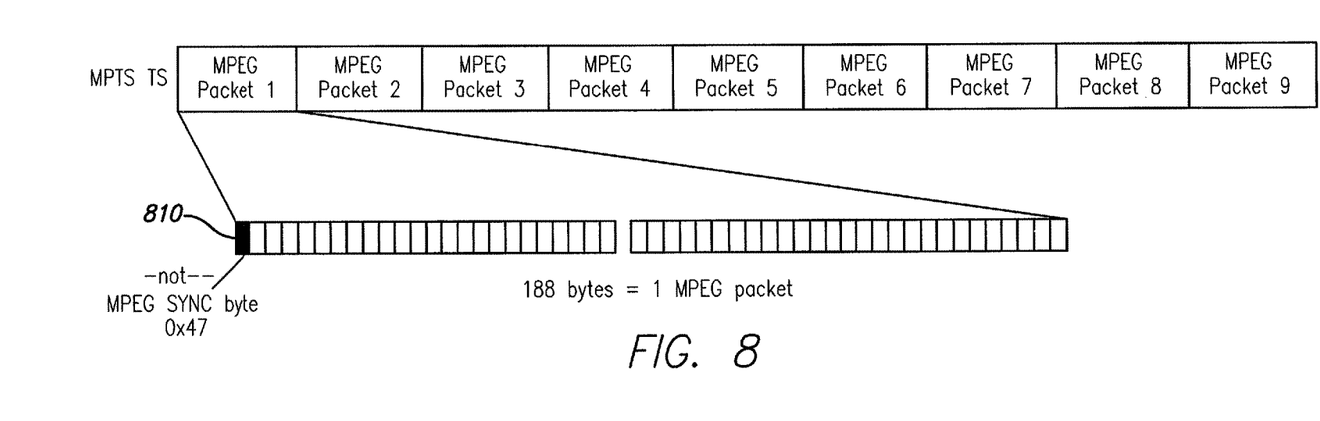
FIG. 8 is a schematic view of MPEG packets.

Referring to FIG. 8, to allow communications with the remote QAM, the SYNC (synchronization) byte at the start of every MPEG packets (normally 0x47) can be replaced with a data byte 810. This allows data to be passed to the remote QAM by the multiplexer.

Figure 9:
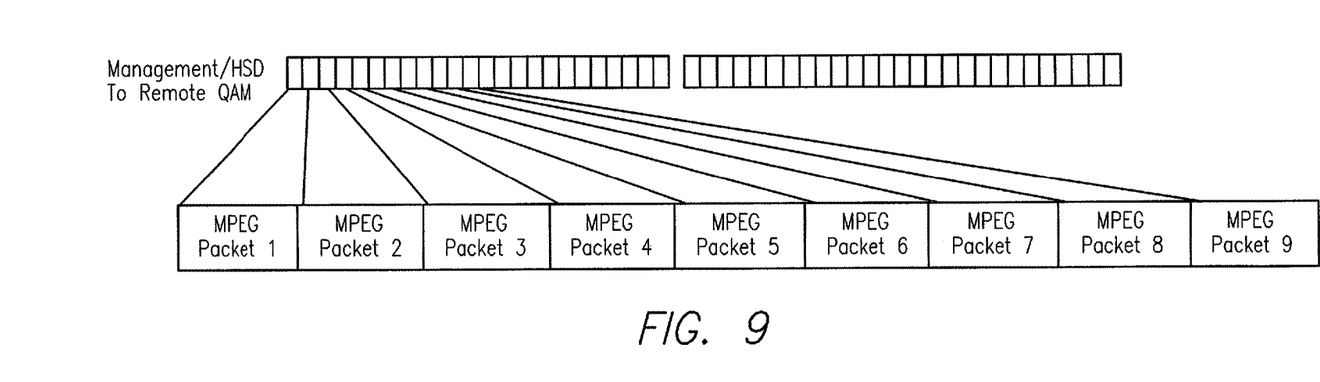
FIG. 9 is a schematic view of MPEG packets.

Referring to FIG. 9, the remote QAM can then replace the data byte from the multiplexer with 0x47 before processing the packet through the modulator. This allows 1/188 of the data rate to be reclaimed for high speed data services or management functions such as a software upgrade while retaining the normal clocking expected for MPEG transport streams. For a 158 channel remote QAM, this provides a downstream (from head end to the edge) data rate for 158 channels of 42 mbit/sec (42 mbit/sec is the typical rate for a 256 QAM video channel; 158 channels/remote QAM is also typical) (1/188), or about 35 megabits per second.

Definitions

The term universal services multiplexer, sometimes referred to as a node QAM, is intended to mean a device located at the cable operator head end which takes single or multiple program transport streams (SPTS or MPTS) and processes them to produce a sequence of data which is fed to a remote QAM, for example by interleaving the data in the streams into a serial bit stream before transmitting it to the remote QAM via a dedicated laser. The term remote QAM, sometimes referred to as a remote QAM module, is intended to mean a device that produces an output which combines multiple stream s to produce a single RF output.

The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz. The terms light and optical are intended to mean frequencies greater than or equal to approximately 300 GHz.

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The terms proximate and edge, as used herein, is intended to mean close, near adjacent and/or coincident; and includes spatial situations where specified functions and/or results (if any) can be carried out and/or achieved. The terms distal and remote, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:
1. A method of video distribution processing, comprising:
 interleaving multiple streams of SPTSs and MPTSs using a universal services multiplexer to form a time interleaved multiplexer stream (TIMS) of MPTSs; and
 conveying the time interleaved multiplexer stream in a dedicated transmission from the universal services multiplexer to a TIMS conversion unit not collocated with the universal services multiplexer, having an input buffer that accepts data from the universal services multiplexer, wherein the universal services multiplexer produces an MPEG output format is digitally transported to the TIMS conversion unit, wherein modulation of the time interleaved MPTSs into a multichannel RF signal is carried out in the TIMS conversion unit, and wherein all timing and rate management is conducted at the universal services multiplexer.

2. The method of claim 1, further comprising receiving the time interleaved multiplexer stream at the TIMS conversion unit.

3. The method of claim 2, further comprising conveying a single RF output to a customer premises RF signal equipment from the TIMS conversion unit.

4. The method of claim 2, further comprising conveying another time interleaved multiplexer stream to another TIMS conversion unit; and receiving the another time interleaved multiplexer stream at the another TIMS conversion unit.

5. The method of claim 4, further comprising conveying another single RF output to another customer premises RF signal equipment from the another TIMS conversion unit.

6. The method of claim 2, wherein the universal services multiplexer breaks the time interleaved multiplexer stream into segments where each segment fits within an Ethernet frame.

7. The method of claim 6, wherein each segment includes at least one time interleaved multiplexer chunk that includes bytes destined for a particular output modulator located in the TIMS conversion unit.

8. The method of claim 7, wherein each packet of each stream of data is broken down to fragments, where a fragment length is a size of a time interleaved multiplexer chunk.

9. The method of claim 7, wherein each of packet of each stream of data is broken down into packets with IP headers added.

10. A process of operating a hybrid fiber coax network including the method of claim 1.

11. A system for distributing data, comprising:
a universal services multiplexer that interleaves multiple streams of data into a time interleaved multiplexer stream (TIMS); and
a TIMS conversion unit coupled to the universal services multiplexer but not collocated with the universal services multiplexer, the TIMS conversion unit having an input buffer that accepts data from the universal services multiplexer,
wherein the universal services multiplexer produces an MPEG output format that is digitally transported in a dedicated transmission to the TIMS conversion unit,
wherein modulation of digital data into a multichannel RF signal is carried out in the TIMS conversion unit,
wherein the TIMS conversion unit produces a multichannel RF output, and
wherein all timing and rate management is conducted at the universal services multiplexer.

12. The system of claim 11, further comprising a customer premises equipment coupled to the TIMS conversion unit.

13. The system of claim 11, further comprising another TIMS conversion unit coupled to the universal services multiplexer, but remote from the universal service multiplexer.

14. The system of claim 13, further comprising another customer premises equipment coupled to the another TIMS conversion unit.

15. The system of claim 11, wherein the universal services multiplexer breaks the time interleaved multiplexer stream into segments where each segment fits within an Ethernet frame.

16. The system of claim 15, wherein each segment includes at least one time interleaved multiplexer chunk that includes bytes destined for a particular output modulator located in the TIMS conversion unit.

17. The system of claim 11, further comprising an allocator coupled to the input buffer and a plurality of modulators coupled to the allocator.

18. The system of claim 11, wherein the TIMS conversion unit is coupled to the universal services multiplexer with a packet switched network.

19. A hybrid fiber coax network comprising the system of claim 11.

* * * * *